(12) United States Patent
Marchione

(10) Patent No.: US 11,745,256 B2
(45) Date of Patent: Sep. 5, 2023

(54) CASTING PARTS CYCLE LIFE IMPROVEMENT USING LOCALIZED GRADIENT MATERIAL

(71) Applicant: Caterpillar Inc., Peoria, IL (US)

(72) Inventor: Thierry Andre Marchione, Heber City, UT (US)

(73) Assignee: Caterpillar Inc., Peoria, IL (US)

( * ) Notice: Subject to any disclaimer, the term of this patent is extended or adjusted under 35 U.S.C. 154(b) by 77 days.

(21) Appl. No.: 17/126,517

(22) Filed: Dec. 18, 2020

(65) Prior Publication Data

US 2022/0193760 A1    Jun. 23, 2022

(51) Int. Cl.
| | | |
|---|---|---|
| *B22D 19/10* | (2006.01) | |
| *B33Y 10/00* | (2015.01) | |
| *B22C 9/02* | (2006.01) | |
| *B33Y 80/00* | (2015.01) | |

(52) U.S. Cl.
CPC .............. *B22D 19/10* (2013.01); *B22C 9/02* (2013.01); *B33Y 10/00* (2014.12); *B33Y 80/00* (2014.12)

(58) Field of Classification Search
CPC ........ B22D 19/10; B22D 19/02; B22D 19/06; B22D 19/08; B22D 19/0036; B22C 9/02; B33Y 10/00; B33Y 80/00
See application file for complete search history.

(56) References Cited

U.S. PATENT DOCUMENTS

| | | | |
|---|---|---|---|
| 6,038,906 A | 3/2000 | Hartung et al. | |
| 6,626,576 B1 | 9/2003 | Cadle et al. | |
| 8,043,684 B2 | 10/2011 | Shi | |
| 8,246,783 B2 | 8/2012 | Zaoralek | |
| 8,616,851 B2 | 12/2013 | Didomizio et al. | |
| 9,067,282 B2 | 6/2015 | Sharp | |
| 10,166,629 B2 | 1/2019 | Young et al. | |
| 2015/0167129 A1 | 6/2015 | Didomizio et al. | |
| 2016/0138144 A1* | 5/2016 | Olsérius ................ C22C 1/0433 219/76.1 |
| 2020/0166092 A1 | 5/2020 | Gonska | |
| 2020/0206810 A1 | 7/2020 | Lavi | |

FOREIGN PATENT DOCUMENTS

EP    3084026 B1    9/2019

OTHER PUBLICATIONS

Kim Jin-Young et al: "LAM-DED Process for Repair and Maintenance of Cast Iron Components using Metallic Powder Alloys", Journal of Welding and Joining, [Online] vol. 38, No. 4, Aug. 30, 2020 (Aug. 30, 2020), pp. 349-358, XP055898236, ISSN: 2466-2232, DOI: 10.5781/JWJ.2020.38.4.3 Retrieved from the Internet: URL:http://e-jwj.org/journal/view.php?doi=10.5781/JWJ.2020.38.4. 3> [retrieved on Mar. 7, 2022] figure 2b; table 1.

(Continued)

*Primary Examiner* — Kevin P Kerns
*Assistant Examiner* — Steven S Ha

(57) ABSTRACT

A method of additive manufacturing can include forming a machine part having a first portion formed from a cast iron material; forming a second portion adjacent the first portion formed of a combination of the cast iron material and a different material; and forming a third portion adjacent the second portion formed of only the different material, wherein the third portion is located at a predetermined critical area of the machine part.

11 Claims, 4 Drawing Sheets

(56) References Cited

OTHER PUBLICATIONS

Sridharan Niyanth: "Development of volume deposition on cast iron by additive manufacturing", Nov. 10, 2016 (Nov. 10, 2016), pp. 1-17, XP055898203, Retrieved from the Internet: URL: https://info.ornl.gov/sites/pulications/Files/Pub71975.pdf [retrieved on Mar. 7, 2022] p. 2; section 1.2.1.

Written Opinion and International Search Report for Int'l. Patent Appln. No. PCT/US2021/063029, dated Mar. 18, 2022 (14 pgs).

* cited by examiner

CASTING PARTS CYCLE LIFE IMPROVEMENT USING LOCALIZED GRADIENT MATERIAL

TECHNICAL FIELD

The present disclosure generally relates to forming machine parts. More particularly, the present disclosure relates to a system and method improve the life cycle of such parts.

BACKGROUND

To form the parts of work machines, cast iron is a preferred material for heavy equipment parts due to its low cost, low weight, and mechanical properties. However, cast-iron parts can crack if overloaded or overheated. Such failure can be catastrophic, and the repair procedure can be difficult to implement because it involves dissimilar materials and requires welding expertise and cautious thermal management.

US 2015/0167129 discusses particulate strengthened alloy components and methods of forming them.

SUMMARY

In an example according to this disclosure, a method of additive manufacturing can include forming a machine part having a first portion formed from a cast iron material; forming a second portion adjacent the first portion formed of a combination of the cast iron material and a different material; and forming a third portion adjacent the second portion formed of only the different material, wherein the third portion is located at a predetermined critical area of the machine part.

In an example according to this disclosure, a machine part can be formed by a method including forming the machine part having a first portion formed from a cast iron material; forming a second portion adjacent the first portion formed of a combination of the cast iron material and a different material; and forming a third portion adjacent the second portion formed of only the different material, wherein the third portion is located at a predetermined critical area of the machine part.

In an example according to this disclosure, a method of remanufacturing or repairing a machine part can include using additive manufacturing such that a first portion of the machine part furthest from a predetermined critical area of the machine part is repaired using a cast iron material; using additive manufacturing such a second portion of the machine part adjacent the first portion is formed of a combination of the cast iron material and a different material; and using additive manufacturing such that a third portion of the machine part adjacent the second portion is formed of only the different material, wherein the third portion is located at the predetermined critical area of the machine part.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
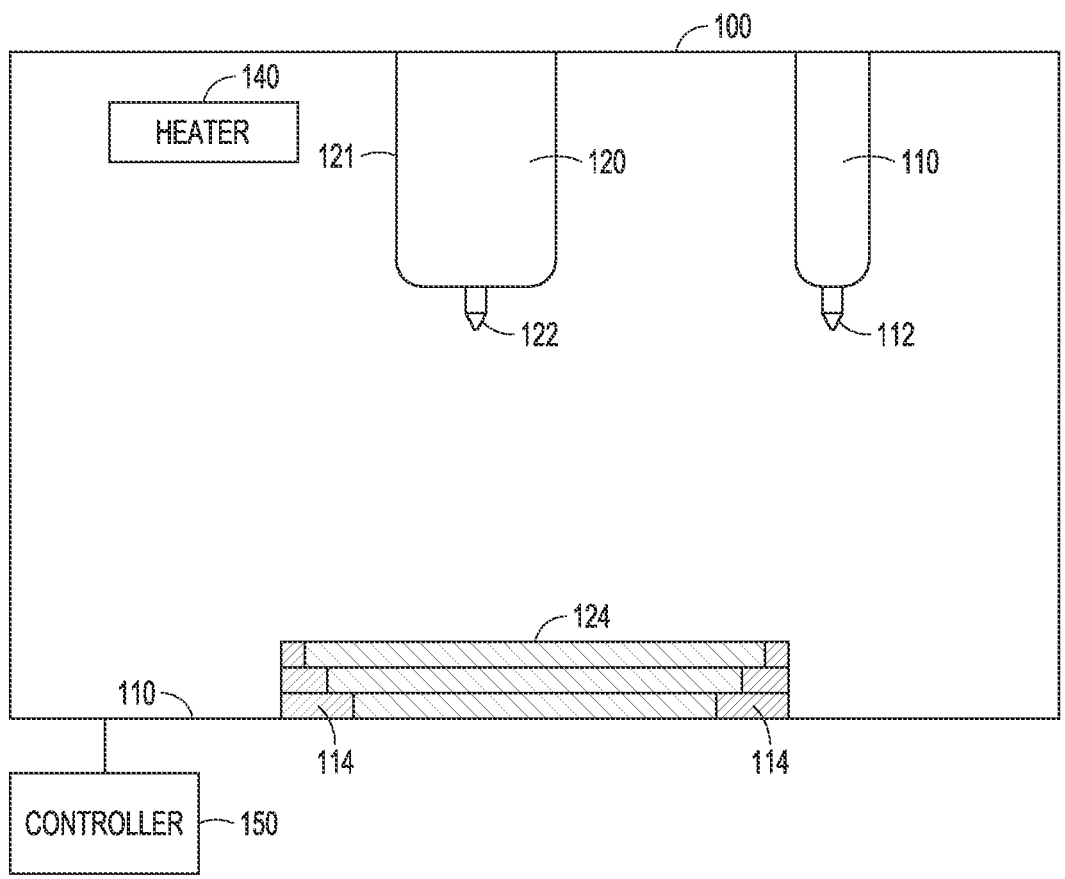
FIG. 1 shows a schematic representation of an additive manufacturing apparatus, in accordance with one embodiment.

FIG. 1 shows a schematic representation of an additive manufacturing casting apparatus 100, in accordance with one embodiment. The additive casting apparatus 100 can be for forming a 3D printed metal machine part. The casting apparatus 100 can generally include a movable mold material dispensing unit 110. The dispensing unit 110 can include one or more nozzles 112 for depositing the mold material. The apparatus 100 further includes a movable molten metal pouring unit 120, which can include a crucible 121. The pouring unit 120 can include one or more nozzles 122 for pouring at least one molten metal. The apparatus 100 can further include a build table 130 for holding the deposited mold material and the poured molten metal.

The apparatus 100 further includes a controller 150 configured to control the movable mold material dispensing unit 110 to deposit a first portion of a mold 114, layer by layer, and control the movable molten metal pouring unit 120 to pour at least one liquid substance into the first portion of the mold to form a first casted layer 124. The controller then can control the movable mold material dispensing unit 110 to deposit a second portion of the mold 114, layer by layer, on top of the first portion. And the controller 150 can then control the movable molten metal pouring unit 120 to pour the at least one molten metal into the second portion of the mold to form a second casted layer 124 on top of at least a portion of the first casted layer 124.

In one example, the controller 150 can move or control an induction heater 140 into position to heat and melt the material in the crucible 121. The induction heater 140 can also be used to pre-heat each casted molten metal casted layer 124 prior to pouring of an additional molten metal layer. This preheat process can reduce the temperature gradient between the already solidified casted layer and the molten material being poured to form the additional casted layer.

In some embodiments, movable mold material dispensing unit 110 and/or molten metal pouring unit 120 may be configured to move in two or three axes. In some embodiments, movable mold material dispensing unit 110 and/or molten metal pouring unit 120 can be mounted on an X-Y table configured to move movable mold material dispensing unit 110 and/or molten metal pouring unit 120 to any point over build table 130. In some embodiments, movable mold material dispensing unit 110 can be controlled (e.g., by controller 150) to deposit mold portions 114 (e.g., first, second, third, fourth, etc. portions) layer by layer.

The mold material can be any material suitable for being deposited/printed from a deposition unit and provide a shape for the molten metal. For example, the mold material can include granular material mixed with a binder and configured to hold molten substance at elevated temperatures. The granular material can include ceramic powders (e.g., zirconia, alumina, magnesia, etc.), sand, clay, metallic powders and any combination thereof.

As noted, cast iron is a preferred material for heavy equipment parts due to it low cost, low weight and mechanical properties. However, cast iron and cast-iron parts can crack if overloaded or overheated.

The present system utilizes a process of metal additive manufacturing, such as 3D printing, for fabricating new components (or repairing/remanufacturing existing components) that are composed of cast iron. As will be discussed, parts formed of the present system include at portions of the part surrounding and leading up to certain critical, high stress, or delicate/failure-prone areas, (e.g., voids, openings, ridges, corners, etc.), a gradient where a differing material with desired properties (e.g., more ductile (such as steel)) is gradually introduced into the cast iron printing. In an example, the system as discusses in FIG. 1 can be used in a process including a multi-step material combination and dispensation procedure to achieve a transition in the part from cast iron in one portion to cast iron plus a different material in an adjacent to only the different material defining the critical areas of the part.

Thus, for example, by selectively transitioning from cast iron to steel, the risk of cracking is mitigated and the possibility to apply higher force torque in the localized area is better.

Figure 2:
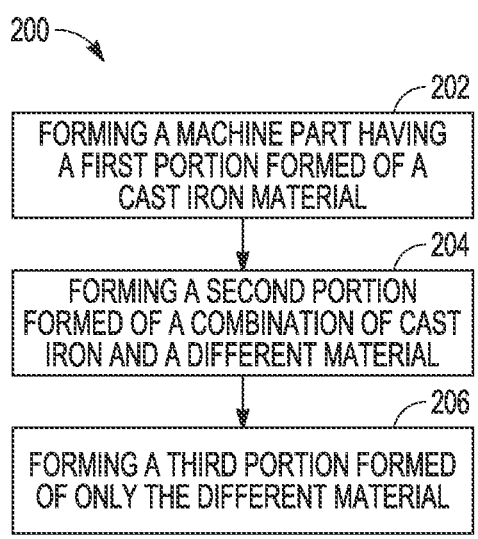
FIG. 2 shows a method of forming a machine part, in accordance with one embodiment.

Thus, for example, FIG. 2 shows a method of forming a machine part, in accordance with one embodiment. In an example, the additive manufacturing method can be a 3D printing process using an apparatus as shown and describe in FIG. 1.

The method 200 can include a first step 202 of forming a machine part having a first portion formed from a cast iron material. Thus, for example, a portion of the machine part that is distant from a critical area of the machine part can be formed of cast iron only. The method 200 can include a second step 204 of forming a second portion of the machine part adjacent the first portion and formed of a combination of the cast iron material and a different material.

Thus, as the additive manufacturing process moves closer to the critical area of the machine part, the different material is gradually added to the cast iron material in the casting process to provide a transition area. Forming the second portion of the machine part can include gradually introducing the different material into the cast iron material. For example, the second portion can be formed such that that the second portion goes from a low concentration of the different material proximate the first portion to a high concentration of the different material proximate the third portion.

The method can include a third step 206 of forming a third portion adjacent the second portion formed of only the different material, wherein the third portion is located at a predetermined critical area of the machine part.

In one example, the present process incorporates a gradual transition during the additive manufacturing process from the cast iron material to a more ductile material, such as steel or other, thus acting as a buffer layer leading up to and then surrounding certain critical, high stress, or delicate/failure-prone areas (e.g., a bearing journal). The different material can be less prompt to cracking and is easier to repair.

Here, the gradual combination and transition of the cast iron material to the added material results in the added material acting as a buffer layer that is less susceptible to cracking and also easier to repair, since welding steel, for example, is easier than repairing cast iron. More particularly, the material with more ductility is placed at the position which is more prone to cracking under overheating or overloading.

Figure 3:
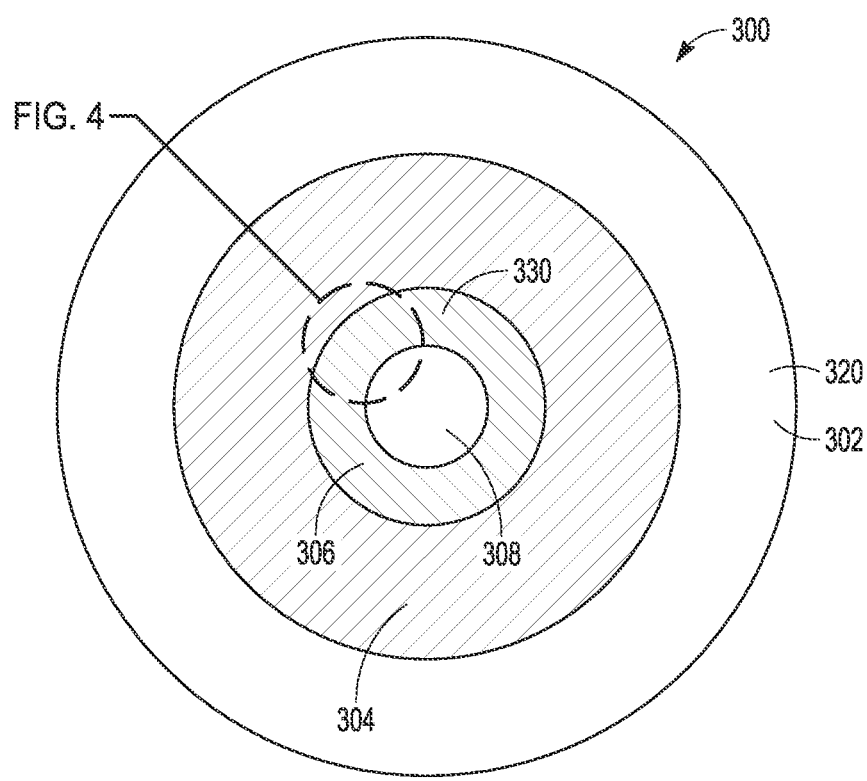
FIG. 3 shows an example of a machine part formed by the method of FIG. 2, in accordance with one embodiment.
Figure 4:
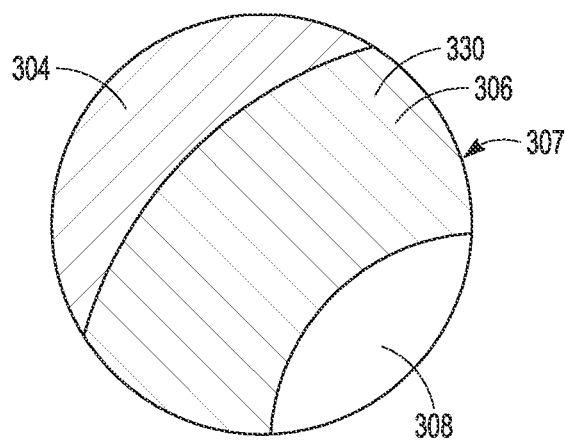
FIG. 4 shows a detail of the machine part of FIG. 3, in accordance with one embodiment.

FIG. 3 shows an example of a machine part 300 formed by the method of FIG. 2, in accordance with one embodiment. FIG. 4 shows a detail of the machine part 300, in accordance with one embodiment.

Here the machine part 300 can generically represent a machine part such as a pulley or a gear having an outer portion 302, a middle portion 304, and a center portion 306 which surrounds a hole 308 which will rotate on a shaft, for example. In this example, a critical area 307 is located in the region of the machine part 300 proximate the hole 308. For example, this can be a high pressure, high stress location of the machine part 300. By providing the transition middle portion 304 to the ductile, third portion 306, the critical area 307 will perform under higher stresses than if the entire part were made of the cast iron material. The transition middle portion 304 provides that the machine part has integrity since the dis-similar materials are slowly blended as the different material is gradually added to the cast iron material until the critical area 307 is only formed of the different (such as more ductile) material.

In this example, the critical area of the machine part can be determined to be the critical area 307 near the center portion 306 proximate the hole 308. (In other examples, depending on the physical make-up and use of the machine part, the critical area can be in the outer portion 302 or the middle portion 304).

Referring again also now to FIG. 2, in this example, the machine part 300 formed by the method of method 200 can include a cast iron material 320 in the outer portion 302, then the middle portion 304 will include the cast iron material 320 and the different material 330 (such as steel), while the center portion 306 will include only the different material 330.

In some examples the predetermined critical area of the machine part can include a high stress, failure prone area of the machine part. For example, an area near a void, or an area under stress from a belt or having a high load thereon.

In one, example, the different material 330 can be a more ductile material than the cast iron material 320. For example, the different material 330 can be a steel material.

Thus, this system protects the machine part from failure due to the ductile nature of the steel material. Also, if the machine part does fail, it is easier to repair the failure since the steel area can be more easily welded than cast iron. Such a machine part as discussed herein can be more resilient than a part made of pure cast iron and can be easier to repair if a crack develops. Thus, the process offers and improvement in the strength and quality of machine components.

Machine part 300 can generically represent many machine parts that can be formed using the present system where the component includes a critical area. For example, various machine parts which can be formed using the present system can include an engine/transmission component and the critical area can be an area prone to stress. For example, the part can be a transmission case and the critical area can be an attachment point. Other examples include a bucket and choky bar.

Figure 5:
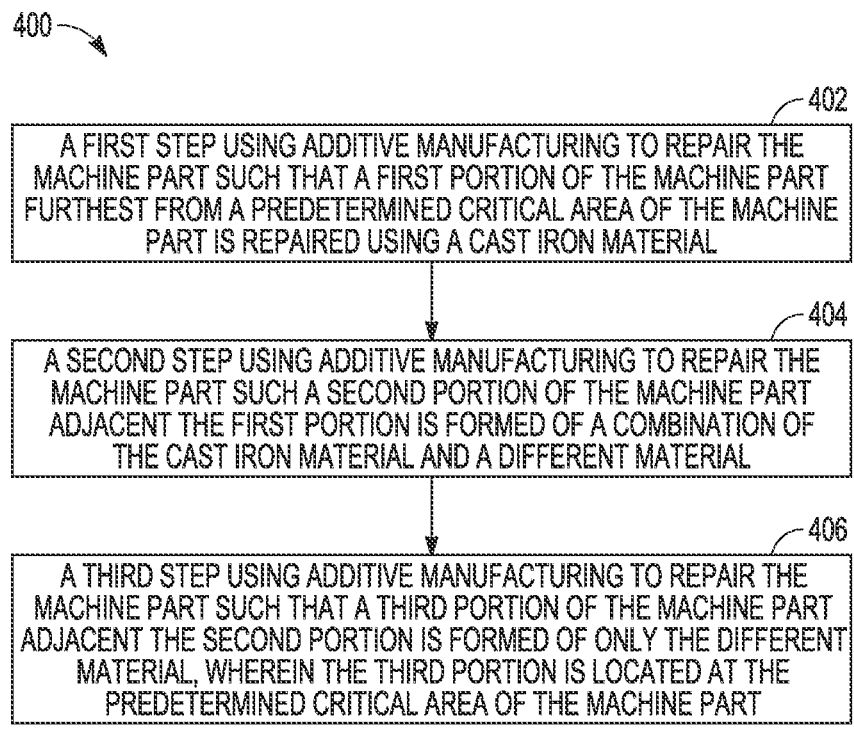
FIG. 5 shows a method of remanufacturing or repair of a machine part, in accordance with one embodiment.

FIG. 5 shows a method 400 of remanufacturing or repair of a machine part, in accordance with one embodiment. The method 400 can include a first step 402 of using additive manufacturing to repair the machine part such that a first portion of the machine part furthest from a predetermined critical area of the machine part is repaired using a cast iron material. The method 400 includes a second step 404 of using additive manufacturing to repair the machine part such a second portion of the machine part adjacent the first portion is formed of a combination of the cast iron material and a different material. The method 400 can include a third step 406 of using additive manufacturing to repair the machine part such that a third portion of the machine part adjacent the second portion is formed of only the different material, wherein the third portion is located at the predetermined critical area of the machine part.

As noted above, in some examples the different material can be a more ductile material than the cast iron material, for example, a steel material. The additive manufacturing process can be done using a 3D printing process.

Any of the machine parts discussed above can be remanufactured or repaired using the present system. Thus, parts made by a normal manufacturing process can be remanufactured using the present process, and parts made by the present process can be remanufactured and repaired using the present process.

INDUSTRIAL APPLICABILITY

The present system can be applicable to any part or component of a machine where the part is made of cast iron, including, transmission, engine, and other parts subject to wear. It can also be applicable to the remanufacturing and repair of such parts.

The additive manufacturing process discussed herein can be done, for example, similar to a method as discussed in United States Patent Application 2020/0206810 assigned to Magnus Metal LTD., which is incorporated herein by reference in its entirety.

Figure 6:
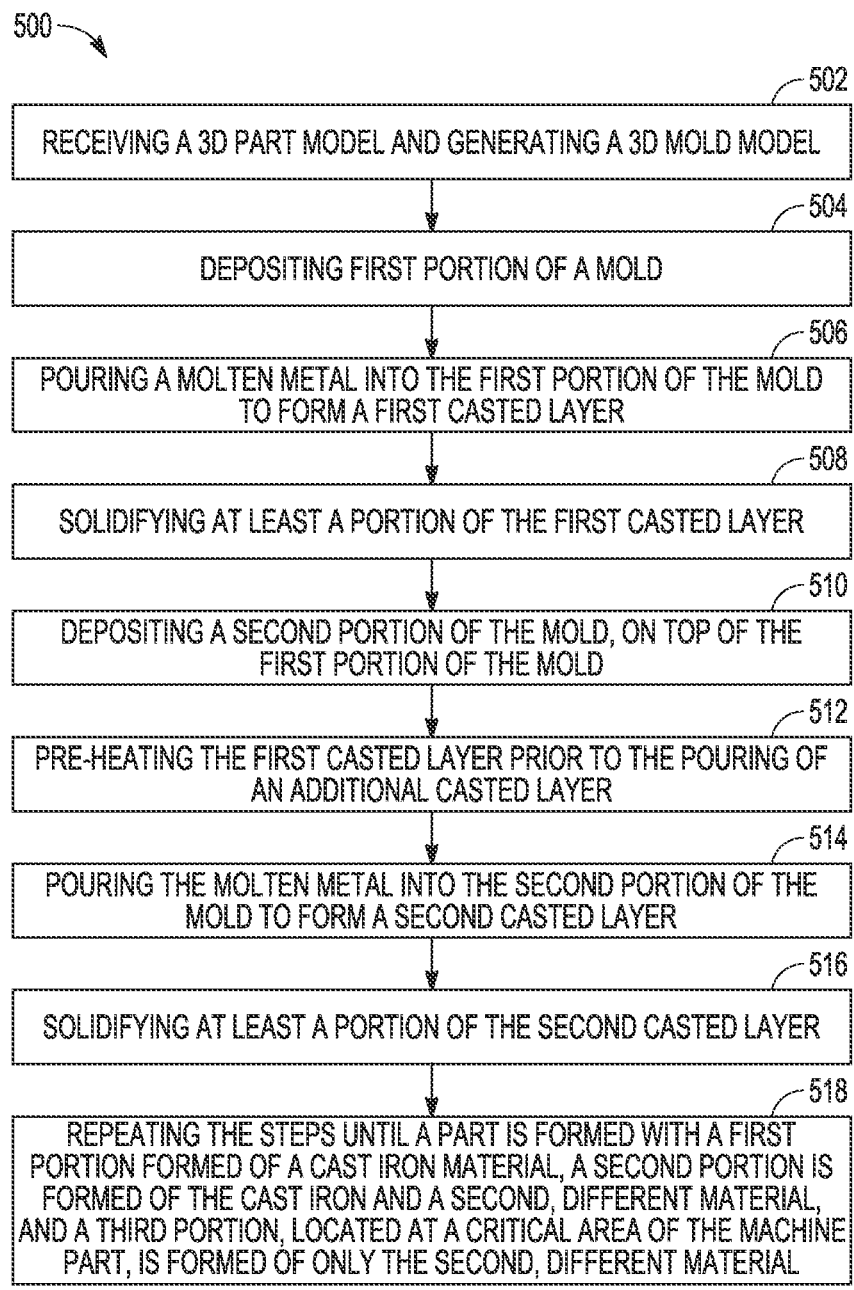
FIG. 6 shows a method of additive manufacturing, in accordance with one embodiment.

For example, the process can include a multi-step procedure dispensing metal material with a micro crucible heated with the help of an induction coil. The material with more ductility is added to the cast iron and then placed at the position which is more prone to cracking under overheating or overloading FIG. 6 shows a more detailed method 500 for the additive manufacturing (or repairing) process discussed above. For example, the method 500 can include a step 502 of receiving a three-dimensional (3D) part model and generating a 3D mold model. After the mold model is entered into the controller of the system, the method 500 can include a step 504 of depositing, on a build table, a first portion of a mold. The method 500 can include a step 506 of pouring a molten metal into the first portion of the mold to form a first casted layer. The method 500 can include a step 508 of solidifying at least a portion of the first casted layer.

The method 500 can include a step 510 of depositing a second portion of the mold, on top of the first portion of the mold. In one option, the method 500 can include a step 512 of pre-heating each casted layer prior to the pouring of an additional casted layer. The method 500 can include a step 514 of pouring the molten metal into the second portion of the mold to form a second casted layer, on top of at least a portion of the first casted layer. The method 500 can include a step 516 of solidifying at least a portion of the second casted layer. Finally, the method 500 can include a step 518 of repeating the above steps until a part is formed with a first portion formed of a cast iron material, a second portion is formed of the cast iron and a second, different material, and a third portion, located at a critical area of the machine part, is formed of only the second, different material.

In other embodiments, other processes for 3D printing of metal objects can include deposition of metal powder/particles, layer by layer, followed by a selective laser sintering (SLS) to melt/solidify the fine deposited layer.

In summary, the present system, as discussed above, provides a metallic 3D printing, additive manufacturing process wherein an additional material (e.g., steel) is gradually added to the cast iron print media using an additive manufacturing formation/integration process to result in a material composition which transitions to ductile material in the machine part proximate to critical areas. Such a machine part as discussed herein can be more resilient than a part made of pure cast iron and can be easier to repair if a crack develops. Thus, the process offers and improvement in the strength and quality of machine components.

The above detailed description is intended to be illustrative, and not restrictive. The scope of the disclosure should, therefore, be determined with references to the appended claims, along with the full scope of equivalents to which such claims are entitled.

What is claimed is:

1. A method of additive manufacturing, the method comprising:
    forming a machine part having a first portion formed from a cast iron material;
    forming a second portion adjacent the first portion including applying a material mixture including a combination of the cast iron material and a different material, wherein applying the material mixture of the second portion includes introducing the different material into the cast iron material at such a rate that the material mixture of the second portion transitions from a low concentration of the different material in the material mixture proximate the first portion to a high concentration of the different material in the material mixture proximate the third portion; and
    forming a third portion adjacent the second portion formed of only the different material, wherein the third portion is located at a predetermined critical area of the machine part.

2. The method of claim 1, wherein the predetermined critical area includes a high stress, failure prone area of the machine part.

3. The method of claim 1, wherein the different material is a more ductile material than the cast iron material.

4. The method of claim 3, wherein the different material is a steel material.

5. The method of claim 1, wherein forming the machine part, forming the second portion, and forming the third portion are all done using a 3D printing process.

6. A method of additive manufacturing, the method comprising:
    forming a machine part having a first portion formed from a cast iron material;
    forming a second portion adjacent the first portion formed of a combination of the cast iron material and a different material; and
    forming a third portion adjacent the second portion formed of only the different material, wherein the third portion is located at a predetermined critical area of the machine part, wherein forming the second portion includes dispensing the cast iron and the different material using a single crucible holding both the cast iron and the different material and using an induction heater to pre-heat each casted layer prior to a pouring of an additional layer.

7. A method of remanufacturing or repairing a machine part, the method comprising:

using additive manufacturing such that a first portion of the machine part furthest from a predetermined critical area of the machine part is repaired using a cast iron material;

using additive manufacturing such a second portion of the machine part adjacent the first portion is formed of a combination of the cast iron material and a different material; and using additive manufacturing such that a third portion of the machine part adjacent the second portion is formed of only the different material, wherein the third portion is located at the predetermined critical area of the machine part.

8. The method of claim 7, wherein the different material is a more ductile material than the cast iron material.

9. The method of claim 8, wherein the different material is a steel material.

10. The method of claim 7, wherein all of the additive manufacturing is done using a 3D printing process.

11. The method of claim 7, wherein where the additive manufacturing includes dispensing the cast iron and the different material using a crucible holding the cast iron and the different material and using an induction heater to pre-heat each casted layer prior to the pouring of an additional layer.

\* \* \* \* \*